(12) United States Patent
Plahuta et al.

(10) Patent No.: US 6,983,904 B2
(45) Date of Patent: Jan. 10, 2006

(54) GUILLOTINE SHEARS

(75) Inventors: Igor Plahuta, Menden (DE); Udo Becker, Menden (DE)

(73) Assignee: Artech Recyclingtechnik GmbH, Iserlohn (DE)

(*) Notice: Subject to any disclaimer, the term of this patent is extended or adjusted under 35 U.S.C. 154(b) by 112 days.

(21) Appl. No.: 10/297,112

(22) PCT Filed: May 30, 2001

(86) PCT No.: PCT/EP01/06151

§ 371 (c)(1),
(2), (4) Date: Apr. 9, 2003

(87) PCT Pub. No.: WO01/91905

PCT Pub. Date: Dec. 6, 2001

(65) Prior Publication Data

US 2003/0222163 A1 Dec. 4, 2003

(30) Foreign Application Priority Data

May 30, 2000 (DE) .................................. 200 09 718 U

(51) Int. Cl.
*B02C 18/18* (2006.01)

(52) U.S. Cl. ....................................... 241/242; 241/294
(58) Field of Classification Search ................. 241/31, 241/287, 285.3, 285.2, 286, 242, 243, 294
See application file for complete search history.

(56) References Cited

FOREIGN PATENT DOCUMENTS

| DE | 273985 A1 | 12/1989 |
| DE | 43 28 506 C1 | 2/1995 |
| DE | 195 14 951 A1 | 10/1996 |
| GB | 1104087 | 2/1968 |
| GB | 1 319 704 | 6/1973 |

OTHER PUBLICATIONS

International Preliminary Examination Report for related PCT case.

*Primary Examiner*—Mark Rosenbaum
(74) *Attorney, Agent, or Firm*—Margaret Polson; Patent Law Offices of Rick Martin, P.C.

(57) ABSTRACT

The invention discloses an impact shears having a rotor with individual chopping blades disposed on the rotor in a predetermined arrangement and with blade(s) or blade system that is generally stationary vis-à-vis the rotation of the rotor. The blade is held in a blade holder on the stator side of the rotor. The blade holder is movable on the stator about an axis parallel to the rotational axis of the rotor and carries at least two blades, or blade systems, that are expediently disposed at the same angular distance to one another. The blade holder can be rotated about an axis that extends parallel to the rotational axis of the rotor so that every blade of the blade holder can be brought in a cutting position to interact with the chopping blades of the rotor and can be locked in position with respect to the chopping blades.

13 Claims, 2 Drawing Sheets

GUILLOTINE SHEARS

CROSS REFERENCE APPLICATIONS

This application is a national phase application claiming priority from PCT application no. PCT/EP01/06151 filed on 30 May 2001 and claiming priority from German application 200 09 718.02 filed on 30 May 2000

FIELD OF INVENTION

The present invention relates to an impact shears with a rotor equipped with individual chopping blades in a predetermined configuration. The impact shears have at least one blade, or blade configuration, held in a blade holder which is fundamentally stationary relative to the rotational movement of the rotor and disposed at the stator side relative to the rotor. The blade holder is movable about an axis parallel to the rotational axis of the rotor relative to the stator.

BACKGROUND OF THE INVENTION

Impact shears are employed in the field of recycling for the fine grinding of material already coarsely ground and other related applications. The coarse grinding of recyclable objects takes place by a rotor shears or other methods. The known prior art impact shears have a motor driven rotor which carries a multiplicity of individual chopping blades. During operation the impact shears grind the desired material by the blades cooperating with a stationary blade held at the stator side.

Another known configuration of blades is to have the blades disposed in series, and extending over the entire length of the rotor. The blade of the stator is bolted in a blade holder. The blade holder can be set up in the radial direction with respect to the rotational axis of the rotor equipped with the chopping blades. This allows the user not only to set primarily the cutting gap, but also to be able to reset the cutting gap after a blade has been worn out. For this purpose the blade is bolted to the blade holder and consequently fixed in its position while the blade holder can be set via several setscrews relative to the stator in the above-described direction.

DE 195 14 951 C2 discloses a waste grinder in which the setting of the cutting gap takes place by utilization of an eccentric, which is simplified compared to the application of several setscrews.

In order to change the stationary blade, the blade must be removed from the blade holder and be replaced by a new one. In addition, the cutting gap between the new blade and the chopping blades on the rotor must be reset. In the case of grinding a very hard material, the wear and tear of the stationary blade is so high that it must be changed several times a week. This replacement of the blades is time consuming and during this time the impact shears are not operational.

In order to extend the changing intervals it is known to provide for the adjustability of the cutting gap, since the cutting gap resetting can be carried out in less time than a blade replacement. However, after a cutting gap resetting, cutting takes place with dull blades. Under some circumstances this can have a disadvantageous effect on the desired cutting result. Additionally, the danger exists that an overloaded blade can lead to the blocking of the rotor. For this purpose, in a chip breaker according to DE 43 28 506 C1 it is known to dispose the blade holder pivotably about an axis parallel to the rotational axis of the rotor at the upper end of a rotating shaft in order to provide an outside engagement position relative to the chopping blades of the rotor. This outside engagement position of the stator side blade relative to the chopping blades of the rotor takes place under formation of a coarse scale outlet as overload safety feature if a selectable cutting resistance has been exceeded. This ensures that such objects that cannot be ground can be immediately brought out of the cutting gap without the rotor needing to be stopped.

Building on this discussed prior art the present invention addresses the problem of providing an impact shears of the above described type in which the service life is increased and a blade change is facilitated.

This problem is solved according to the present invention wherein the blade holder carries at least two blades, usefully disposed at a mutually equal angular distance with respect to one another, or a blade configuration. The blade holder is rotatable about the axis extending parallel to the rotational axis of the rotor, such that each blade, or each blade configuration of the blade holder, can be brought into cutting position cooperating with the chopping blades of the rotor. In the cutting position one blade or one blade configuration cooperates with the chopping blades of the rotor and each blade or each blade configuration can be secured in position with respect to the cooperation with the chopping blades of the rotor.

SUMMARY OF THE INVENTION

The primary aspect of the present invention is to provide an impact shears with blades which can be easily changed, reducing downtime for the machine.

Other aspects of this invention will appear from the following description and appended claims, reference being made to the accompanying drawings forming a part of this specification wherein like reference characters designate corresponding parts in the several views.

Impact shears according to the present invention have a blade holder with at least two blades, or blade configurations disposed with respect to one another at an angular distance, usefully disposed at like angular distance with respect to one another. The blade holder is rotatable about an axis extending parallel to the rotational axis of the rotor such that it is possible for one of the blades, or of the blade configurations, of the blade holder to be in its cutting position and consequently cooperating with the chopping blades of the rotor.

Consequently, without large expenditures and utilizing the rotatability of the blade holder, by rotating the blade holder from its cutting position a worn out blade can be brought out of its cutting position and the second blade be brought into cutting position. The actual replacement of the individual blades with a new one can be scheduled for a point in time at which the impact shears is non-operational in any event. In this case all blades of the blade holder are exchanged in one process. It can also be provided that an exchange of the blade not in its cutting position can be carried out even while the impact shears is in operation while the other blade carried by the blade holder is in its cutting position.

The blade holder is securable in position relative to the stator with a blade is in its cutting position so that during operation of the impact shears a transmission of the rotational movement of the rotor via its chopping blades and the material to be ground does not lead to the swiveling of the blade holder.

For securing the blade holder in position against a rotational movement and for dissipating the forces acting onto the blade holder during operation of the impact shears, a support arm can be provided pivotably articulated on the stator and attached on to the blade holder. The support arm is disposed pivotably with respect to the rotor, such that the entire blade holder can be swiveled away from the rotor.

This can be utilized to carry out a cutting gap setting. Such a cutting gap setting can be accomplished by utilizing an eccentric or corresponding setscrew acting onto the support arm.

The support arm can also serve to be part of an overload safety feature. In this case the support arm is articulated usefully via a bolt having a rated breaking point. When the provided cutting force is exceeded, the bolt having the rated breaking point breaks and the blade holder pivots away from the rotor and damage to the blades or chopping blades is avoided.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
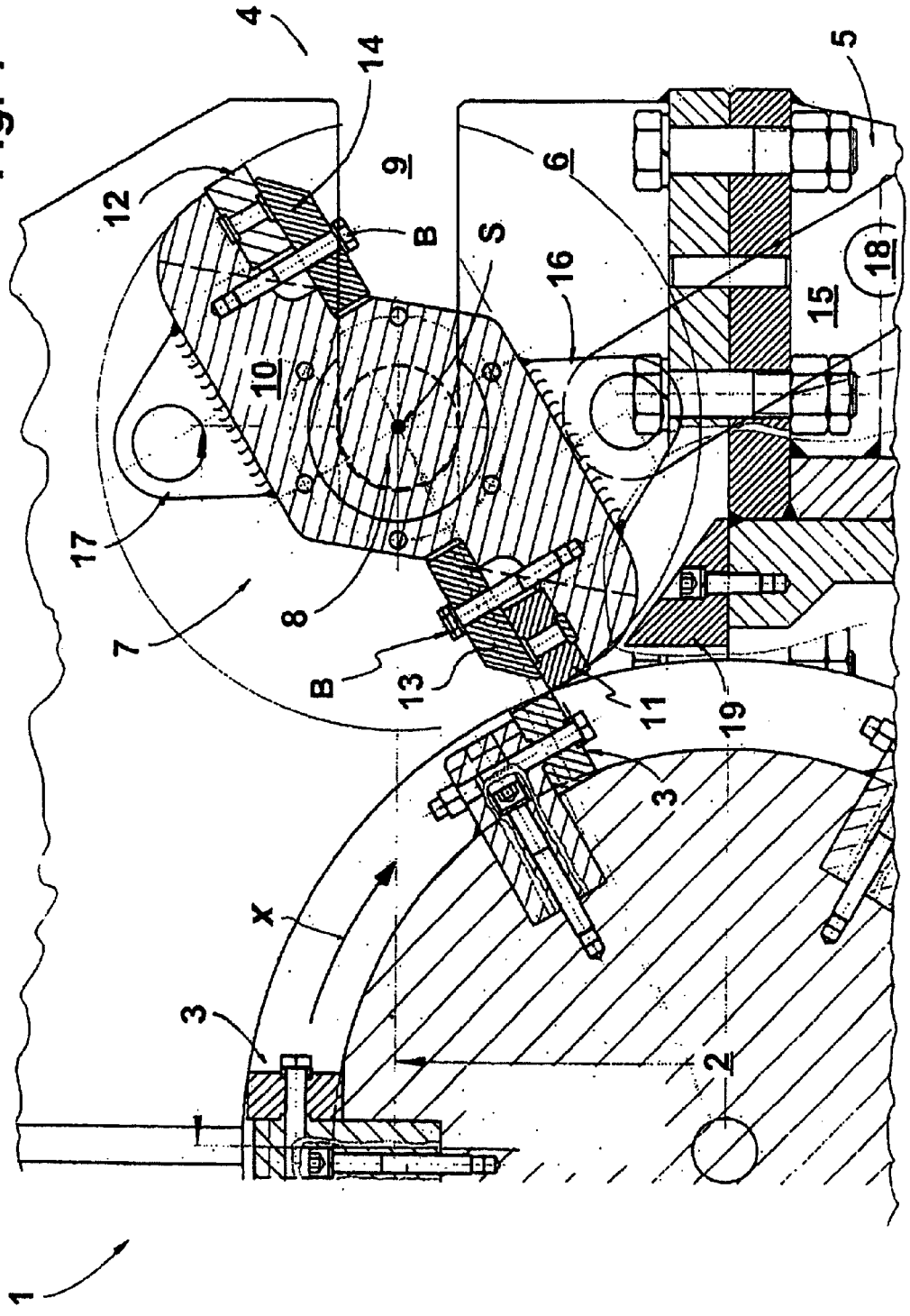
FIG. 1 is a schematic partial view of a front side of an impact shears of the present invention.

Referring first to FIG. 1, an impact shears 1 comprises a rotor 2 driven according to the direction of arrow X depicted in FIG. 1, on whose shell surface a multiplicity of chopping blades 3 is disposed. The rotor 2 is supported in the front sides of a housing 4 serving as stator. The front sides of the housing 4 are formed by a lower yoke plate 5 and an upper yoke plate 6. Attached at the stator side is a blade holder 7, which extends substantially over the entire length of rotor 2. The blade holder 7 is swivellably supported about a pivot axis S extending parallel to the rotational axis of rotor 2. For this purpose, the blade holder 7 comprises at the front side one bearing 8 each, which engages a horizontally extending groove 9 of the upper yoke plate 6 starting from the outer margin of the upper yoke plate 6.

The blade holder 7 of this impact shears 1 has a base body 10, approximately trapezoidal in cross section, has two blades 11, 12 diametrically opposing one another. The blades 11, 12 are each held on the base body 10 by a pressure plate 13, 14 held by bolt B. In FIG. 1, the blade 11 is in its cutting position.

A support arm 15 connected with the base body 10 attaches to one of connection noses 16, 17 to secure the blade holder 7 against a swivel motion during operation of the impact shears 1. In the position depicted in FIG. 1 the blade holder 7 is stayed with base body 10 with the connection nose 16 on support arm 15. A bolt, not shown, extends through an aperture of the support arm 15 and through an aperture of the connection nose 16 to attach the support arm 15 to the connection nose 16. The support arm 15, in turn, is swivellably articulated via a bolt 18 on the lower yoke plate 5.

Bolt 18 has a rated breaking point such that the described staying configuration serves also as an overload safety feature during operation of the impact shears 1.

In order to supply the ground material to the screen (not shown) disposed beneath the rotor 2, a guide lug 19 is disposed beneath the blade in the cutting position.

In a further embodiment example not depicted in the Figures, the support arm 15 is articulated at the stator side via an eccentric. Through an actuation of the eccentric the movement of the position of blade 11 in the cutting position for the cutting gap setting or resetting can take place.

If the blade 11 is worn out, the bolt 18, or the not shown bolt, connecting the support arm 15 with the connection nose 16 is removed. Then the support arm 15 is pivoted down and subsequently the blade holder 7 is swiveled, for example counter to the clockwise direction, such that the blade 12 is in its cutting position. This position is defined by the engagement of the connection bolt for securing in position of the blade holder 7 via the connection nose 17 with support arm 15. This blade exchange can be realized in a few minutes such that the productivity of the impact shears 1 is hardly affected. During operation of the impact shears 1 with the blade 12 in its cutting position, it is possible, if desired, to exchange the blade 11 against a new or newly sharpened one.

Figure 2:
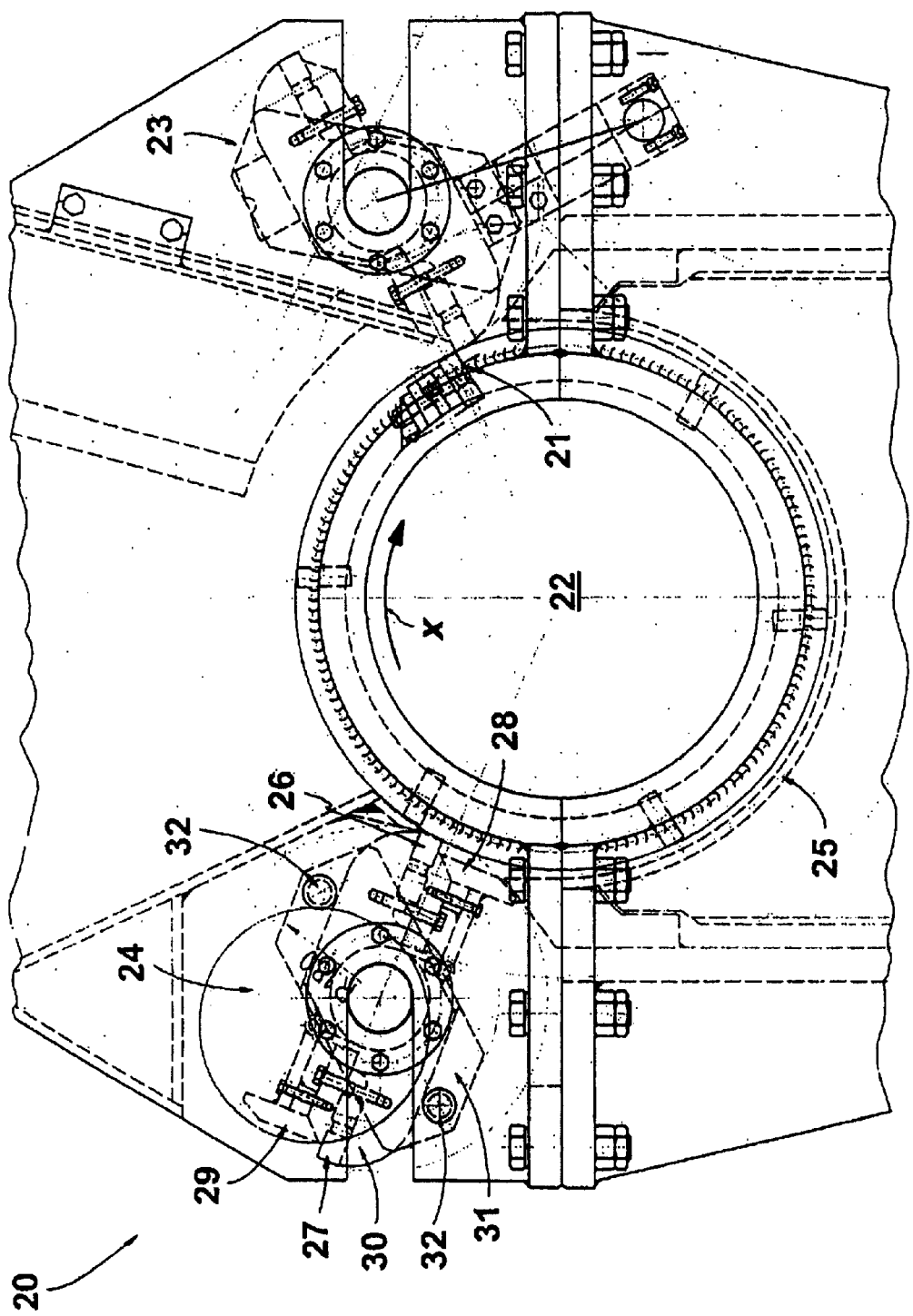
FIG. 2 is a schematic partial view of a front side of an additional embodiment of the impact shears of the present invention.

FIG. 2 depicts a further embodiment of the present invention of the impact shears 20, which is in principle structured corresponding to the impact shears 1 of FIG. 1. The impact shears 20 has a rotor 22 equipped with chopping blades 21 as well as a blade holder 23. Approximately mirror symmetrically to the vertically extending center plane of rotor 22 a further blade holder 24 is associated, which is structured similar to the blade holder 23. Both blade holders are supported pivotably with respect to the stator, the housing. The blade holder 24 functions for fine grinding of the material already ground by blade holder 23, that has not fallen through the screen 25.

The blade holder 24 also comprises two blades 26, 27 which are held in a manner corresponding to the blade holder 23 or blade holder 7 of the impact shears 1. To ensure a defined material feeding into the cutting gap of this blade holder 24 a flow wedge 28 or 29 is provided. Both flow wedges 28, 29 are pivotably articulated on base body 30 for the facilitated accessibility of blade 26 or 27. The blade holder 24 is secured in position torsion tight with respect to the housing via bolts 32 extending through a front side and engaging one fixing cheek 31 parallel to the rotational axis of rotor 22. These bolts 32 have a rated breaking point such that this torsion tight disposition serves simultaneously as overload safety feature.

In particular, the swivellability of an additional configuration of such blade holder is advantageous, since otherwise in this position the accessibility to the blade(s) would hardly be possible at the rear end of the screen.

Another embodiment of the impact shears has two blade holders in the above described configuration. However, in contrast to the previously described embodiment, the two stator side blade holders of this embodiment are developed identically such that the second blade holder is also secured in position torsion tight at the frame side via a support arm. If a locking in position of the blade holders via such a support arm is provided, it is useful to have the frame side or stator side articulation such that a cutting gap setting can take place. This can be done so that the frame side articulation takes place via an eccentric.

In a further implementation an overload safety feature is provided that upon detecting an overload, the drive of the impact shears is automatically switched off. Another possible overload safety feature is for the rotatability of the blade holder to be utilized to rotate the blade in the cutting position to be rotated out of its cutting position cooperating with the chopping blades of the rotor to increase the cutting gap.

According to a further implementation, not shown in the Figures, the rotatable blade holder is supported directly on the frame of the impact shears and can be rotated by means of a stepping motor into its different positions. In this embodiment example in the case of an overload condition, an immediate machine stop is brought about in order to prevent damage to the blade.

If two blade holders 23, 24 are provided it is useful for increasing the service life of the employed stator side blades if the two blade holders 23, 24 have overall such number of blades or blade configurations as corresponds to the number of series of the chopping blades disposed on the rotor. In such an implementation a stator side blade change only needs to be carried out if the chopping blades disposed on the rotor also need to be replaced, even if fundamentally the stator side blades, which are not in cutting position, in principle could also be exchanged during the ongoing operation. For example, in the case of an impact shears whose rotor carries six chopping blade series, an implementation with two blade holders would have three blades or blade configurations.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

LIST OF REFERENCE SYMBOLS

1 Impact shears
2 Rotor
3 Chopping blades
4 Housing
5 Lower yoke plate
6 Upper yoke plate
7 Blade holder
8 Bearing
9 Groove
10 Base body
11 Blade
12 Blade
13 Pressure plate
14 Pressure plate
15 Support arm
16 Connection nose
17 Connection nose
18 Bolt
19 Guide lug
20 Impact shears
21 Chopping blade
22 Rotor
23 Blade holder
24 Blade holder
15 Screen
26 Blade
27 Blade
28 Flow wedge
29 Flow wedge
30 Base body
31 Fixing cheek
32 Bolt
B Bolt
S Pivot axis

What is claimed is:

1. An impact shears comprising:
    a rotor equipped with individual chopping blades in a predetermined configuration and a stator, said rotor having an axis of rotation;
    at least two blades removably attached in a blade holder;
    the blade holder located on the stator side of the rotor and being fundamentally stationary relative to the rotational movement of the rotor;
    the blades being usefully disposed at an equal angular distance with respect to one another on the blade holder,
    the blade holder is rotatable about an axis extending parallel to the rotational axis of rotor such that each blade of the blade holder can individually be brought into a cutting position cooperating with the chopping blades of the rotor; and
    the blade holder can be secured in position with respect to the cooperation of each blade with the chopping blades of the rotor.

2. Impact shears as claimed in claim 1, wherein the blade holder has a bearing, which is set into a horizontally extending bearing groove in a front side of the stator and starting at the outer margin.

3. Impact shears as claimed in claim 1 or 2, wherein the blade holder can be secured such that it is torsion tight.

4. Impact shears as claimed in claim 3, further comprising:
    at least one support arm pivotably articulated on the stator and stayed on the blade holder functioning to lock in position of the blade holder in the cutting position of a blade;
    the support arm functioning to substantially dissipate the forces acing onto the blade in the cutting position the stator side during operation of the impact shears.

5. Impact shears as claimed in claim 4, further comprising a second blade holder disposed at the stator side in a configuration mirror symmetrically to the center plane of the rotor.

6. Impact shears as claimed in claim 4, wherein the at least one support arm is swivellably articulated on the stator by means of a bolt having a rated breaking point.

7. Impact shears as claimed in claim 1, further comprising a second blade holder is disposed at the stator side in a configuration mirror symmetrically to the center plane of the rotor.

8. Impact shears as claimed in claim 7, wherein the blade holders each has a bearing, which is set into a horizontally extending bearing groove in a front side of the stator and starting at the outer margin.

9. Impact shears as claimed in claim 7, wherein the blade holders can be secured such that each is torsion tight.

10. Impact shears as claimed in claim 8, wherein the blade holder can be secured such that it is torsion tight.

11. Impact shears as claimed in claim 7, wherein the second blade holder has associated fixing checks connected torsion tight with to the blade holder by bolts having a rated breaking point engaging through a front side of the stator.

12. Impact shears as claimed in claim 7, further comprising a pivotably articulated flow wedge associated with each blade of the second blade holder.

13. Impact shears as claimed in claim 7, wherein the number of blades on the two blade holders corresponds to the number of series of chopping blades disposed on the rotor.

* * * * *